US010196062B2

United States Patent
Das et al.

(10) Patent No.: US 10,196,062 B2
(45) Date of Patent: Feb. 5, 2019

(54) METHOD FOR LONGITUDINAL CONTROL OF A VEHICLE

(71) Applicant: Ford Global Technologies, LLC, Dearborn, MI (US)

(72) Inventors: Ashrit Das, Cologne (DE); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/488,197

(22) Filed: Apr. 14, 2017

(65) Prior Publication Data
US 2017/0297575 A1    Oct. 19, 2017

(30) Foreign Application Priority Data
Apr. 15, 2016    (DE) .......................... 10 2016 206 423

(51) Int. Cl.
*B60W 10/06* (2006.01)
*B60W 30/18* (2012.01)
(Continued)

(52) U.S. Cl.
CPC .......... *B60W 30/181* (2013.01); *B60W 10/02* (2013.01); *B60W 10/023* (2013.01);
(Continued)

(58) Field of Classification Search
CPC ..... B60W 30/18063; B60W 30/18109; B60W 2710/0644; B60W 30/181; B60W 10/06;
(Continued)

(56) References Cited

U.S. PATENT DOCUMENTS

| 4,719,821 A | 1/1988 | Yagi et al. |
| 6,591,180 B1 | 7/2003 | Steiner |

(Continued)

FOREIGN PATENT DOCUMENTS

| DE | 10047048 A1 | 4/2002 |
| DE | 102012213815 A1 | 7/2013 |

(Continued)

*Primary Examiner* — Ramya P Burgess
*Assistant Examiner* — Lillian T Nguyen
(74) *Attorney, Agent, or Firm* — Raymond L. Coppiellie; Burgess Law Office PLLC

(57) ABSTRACT

A method for stopping of a motor vehicle including providing a creep torque via a drive train of the motor vehicle and then increasing, independently of the driver, engine speed of a drive engine of the drive train to increase a drive torque of the drive engine and simultaneously increasing, independently of the driver, a braking torque of a brake system of the motor vehicle to balance the drive torque and the braking torque of the motor wherein the maximum braking torque is as great as the creep torque during a standstill of the motor vehicle. The method then maintains the braking torque and simultaneously reduces the engine speed of the drive engine to point at which the motor vehicle comes to a standstill. In an alternative embodiment the method includes applying, independently of the driver, a braking torque by a brake system of the motor vehicle, wherein the applied braking torque is as great as the creep torque present when the motor vehicle is at a standstill and then maintaining the braking torque and simultaneously reducing the creep torque of the drive train up to a point at which the motor vehicle comes to a standstill.

14 Claims, 3 Drawing Sheets

(51) Int. Cl.
*B60W 10/02* (2006.01)
*B60W 10/184* (2012.01)

(52) U.S. Cl.
CPC .......... *B60W 10/06* (2013.01); *B60W 10/184* (2013.01); *B60W 30/18063* (2013.01); *B60W 30/18109* (2013.01); *B60W 2510/0657* (2013.01); *B60W 2520/04* (2013.01); *B60W 2520/10* (2013.01); *B60W 2710/027* (2013.01); *B60W 2710/0644* (2013.01)

(58) Field of Classification Search
CPC .. B60W 10/023; B60W 10/02; B60W 10/184; B60W 5200/10; B60W 2510/0657; B60W 2710/027; B60W 2520/04
See application file for complete search history.

(56) References Cited

U.S. PATENT DOCUMENTS

| | | | |
|---|---|---|---|
| 9,327,721 B2* | 5/2016 | Johri | F02N 5/04 |
| 9,663,108 B2* | 5/2017 | Heisel | B60W 30/18063 |
| 2009/0043474 A1 | 2/2009 | Yasuhiro et al. | |
| 2011/0155533 A1* | 6/2011 | Muller | F16D 48/0206 |
| | | | 192/85.63 |
| 2014/0365094 A1* | 12/2014 | Cunningham | B60W 10/02 |
| | | | 701/68 |

FOREIGN PATENT DOCUMENTS

| | | |
|---|---|---|
| DE | 102013208859 A1 | 11/2013 |
| DE | 112012004086 T5 | 7/2014 |

* cited by examiner

METHOD FOR LONGITUDINAL CONTROL OF A VEHICLE

CROSS-REFERENCE TO RELATED APPLICATIONS

Not Applicable.

BACKGROUND OF THE INVENTION

1. Field of the Invention

The present invention relates to a method for controlling longitudinal movement of a motor vehicle; and more particularly, a method for stopping the vehicle.

2. Description of Related Art

A vehicle service brake operates to smoothly stop a motor vehicle, also referred to as a "soft stop". For example, one method for smooth stopping of a motor vehicle includes reducing the hydraulic pressure generated by a foot force-activated brake system, independently of the driver, in a stopping operation.

Vehicles having automatic transmissions typically include a converter between the engine and the automatic transmission. When the transmission is in the "drive state" and the vehicle is braked by means of the service brake or the parking brake until the vehicle is at a standstill, slip occurs in the converter, resulting in a creep torque wherein if the brake is released, the vehicle starts speeding up until a torque equilibrium has set in. With no brakes at all the vehicle settles at a speed of approximately 5 km/h (maximum creep speed). It therefore follows that the creep torque is greatest when the vehicle is at a standstill, because the torque transferred by the converter is generally a function of the input speed and the output speed at the converter. When the vehicle accelerates, the output speed of the converter increases until the output speed is essentially as great as the input speed, that is it equals the engine speed of the vehicle, and the drive torque transferred by the converter diminishes.

It is difficult to entirely avoid the jolt upon stopping of a motor vehicle as a result of an automated intervention in a brake system of the motor vehicle whereby the jolt is no longer perceived by the occupants of the vehicle. This is due primarily to the fact that the brake pressure applied by the brake system must be extremely precisely metered. If the brake pressure is slightly too high at the stopping instant, i.e., during the transition from kinetic friction to static friction at the vehicle brakes, the jolt upon stopping is still perceptible. If the braking torque generated by the brake pressure is slightly lower, than a creep torque provided by the motor vehicle—for example a vehicle equipped with an automatic transmission, the motor vehicle does not stop.

SUMMARY OF THE INVENTION

A method for stopping a motor vehicle including using a drive train to provide a creep torque to the motor vehicle and increasing, independently of the driver, an engine speed of the drive train to increase a drive torque above the creep torque and simultaneously increasing, independently of the driver, a braking torque a brake system of the motor vehicle to achieve a balance between the drive torque and the braking torque of the motor vehicle wherein the maximum braking torque is as great as the creep torque during a standstill of the motor vehicle. The method maintains the maximum braking torque and simultaneously reduces the engine speed of the drive engine to a point at which the motor vehicle comes to a standstill.

In a further embodiment, the method for stopping a motor vehicle includes using a drive train to provide a creep torque to the vehicle after which the method applies, independently of the driver, a braking torque by a brake system of the motor vehicle, wherein the applied braking torque is as great as the creep torque present when the motor vehicle is at a standstill. The method maintains the braking torque and simultaneously reduces the creep torque of the drive train up to a point at which the motor vehicle comes to a standstill.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Parts having an equivalent function are always provided with the same reference numbers in the different figures, and so these are also generally only described once.

Figure 1:
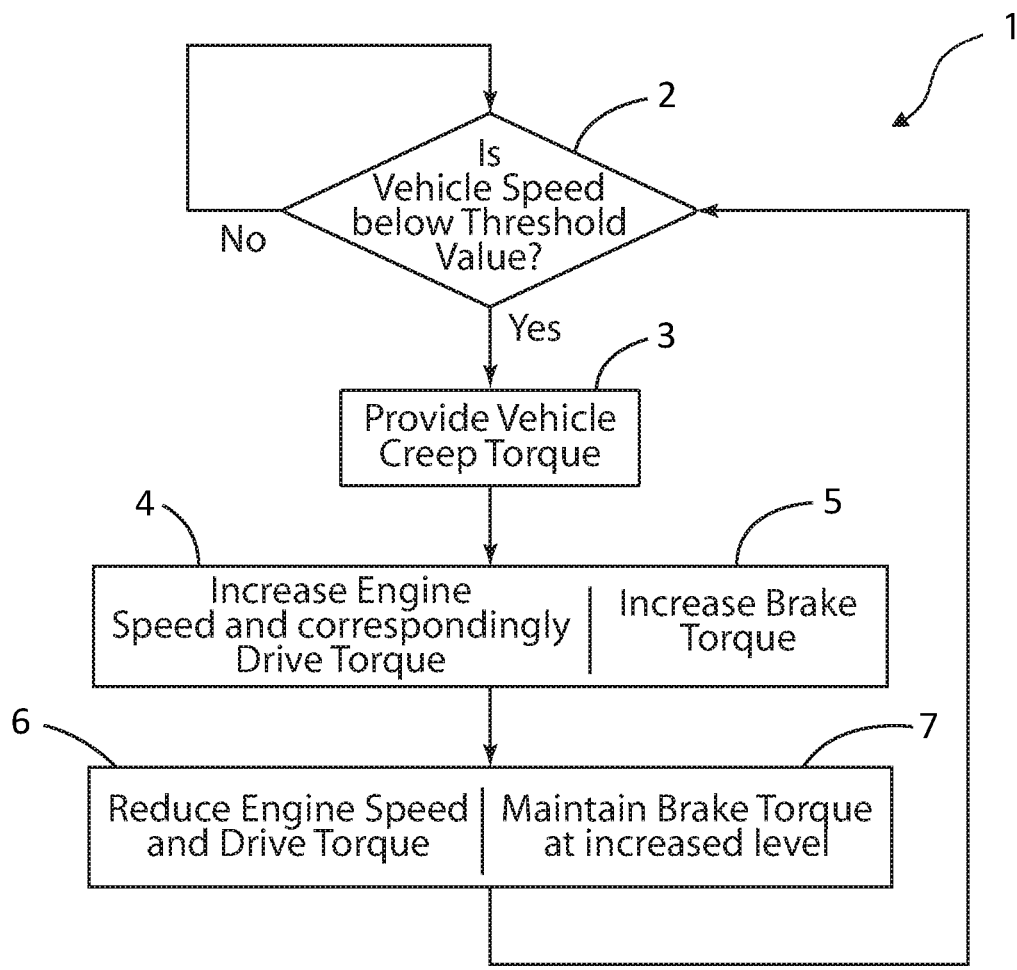
FIG. 1 is a first exemplary embodiment illustrating a flow chart of a method for controlling longitudinal movement of a motor vehicle.

FIG. 1 is a flow chart, according to a first exemplary embodiment of a method 1 according to the invention for the controlling longitudinal movement of a motor vehicle. As illustrated in FIG. 1 initially, in step 2 a check is carried out to determine whether a stopping operation of the motor vehicle is underway. In the exemplary embodiment of the method 1 represented in FIG. 1, a stopping operation occurs when the absolute value of the longitudinal speed of the vehicle is below approximately 1 km/h. Provided the absolute value of the longitudinal speed remains above this threshold value, the method 1 remains in step 2. Accordingly, prior to subsequent step 3, almost all the drive torque of the vehicle is compensated for by the braking torque applied by the automated longitudinal control feature In step 3, the motor vehicle drivetrain provides a creep torque, in particular, a converter of an automatic transmission of the drive train provides the creep torque based on the engine speed; typically, the engine speed at idle. Creep torque develops from zero to maximum value as the vehicle goes from maximum creep speed to a standstill Subsequent steps 4 and 5 take place simultaneously, in step 4, engine speed of the drive train is increased, to increase a drive torque of the drive engine; and in step 5 the brake system of the motor vehicle increases the braking torque, independently of the driver, in a corresponding manner or amount to create or achieve a torque balance between the drive torque and the braking torque of the motor vehicle. In the disclosed embodiment, the applied maximum braking torque is at least as great as the creep torque during a standstill of the motor vehicle whereby due to the torque balance between the drive torque and the braking torque of the motor vehicle, as the motor vehicle does not accelerate during the increase in the speed of the drive engine, but rather remains at or essentially maintains its present speed. Preferably, a braking torque is applied, which is slightly greater than the creep torque present when the motor vehicle is at a standstill, for example the braking torque being approximately 150 Nm greater than the creep torque present at a standstill, in order to safely bring the motor vehicle to a standstill. In one exemplary embodiment of the method 1, when the vehicle is below 1 kph preparing for stop, the creep torque is 200 Nm and the engine speed is 700 rpm. The engine speed is increased to 800 rpm (4) which increases the creep torque to 300 Nm. The braking torque is increased simultaneously to 300 Nm (5) such that the net torque is 0 all this time. The creep torque at standstill is 250 Nm. Subsequent steps 6 and 7 also take place simultaneously wherein the maximum braking torque achieved in step 5 is maintained and, simultaneously, the engine speed of the drive engine is reduced until the motor vehicle comes to a standstill. In the disclosed embodiment of method 1, the engine speed of the drive engine is reduced, for example, to the idle speed of 700, as the minimum. As a result, the difference between the drive torque and the braking torque is negative, whereupon the motor vehicle decelerates and ultimately comes to a standstill. Because the drive engine should be considered to be a sluggishly acting actuator, this procedure takes place slowly whereby any jolt upon stopping of the motor vehicle is no longer perceptible by the vehicle occupants. The drive train of the exemplary embodiment of the method 1, includes an automatic transmission having a torque converter. The converter is effective as a low-pass filter for the transfer of torque between the input side and the output side of the converter and, therefore, achieves a softer transition from a movement state of the motor vehicle to a standstill state.

The method 1 subsequently returns to step 2 and waits for another stopping operation of the motor vehicle.

Figure 2:
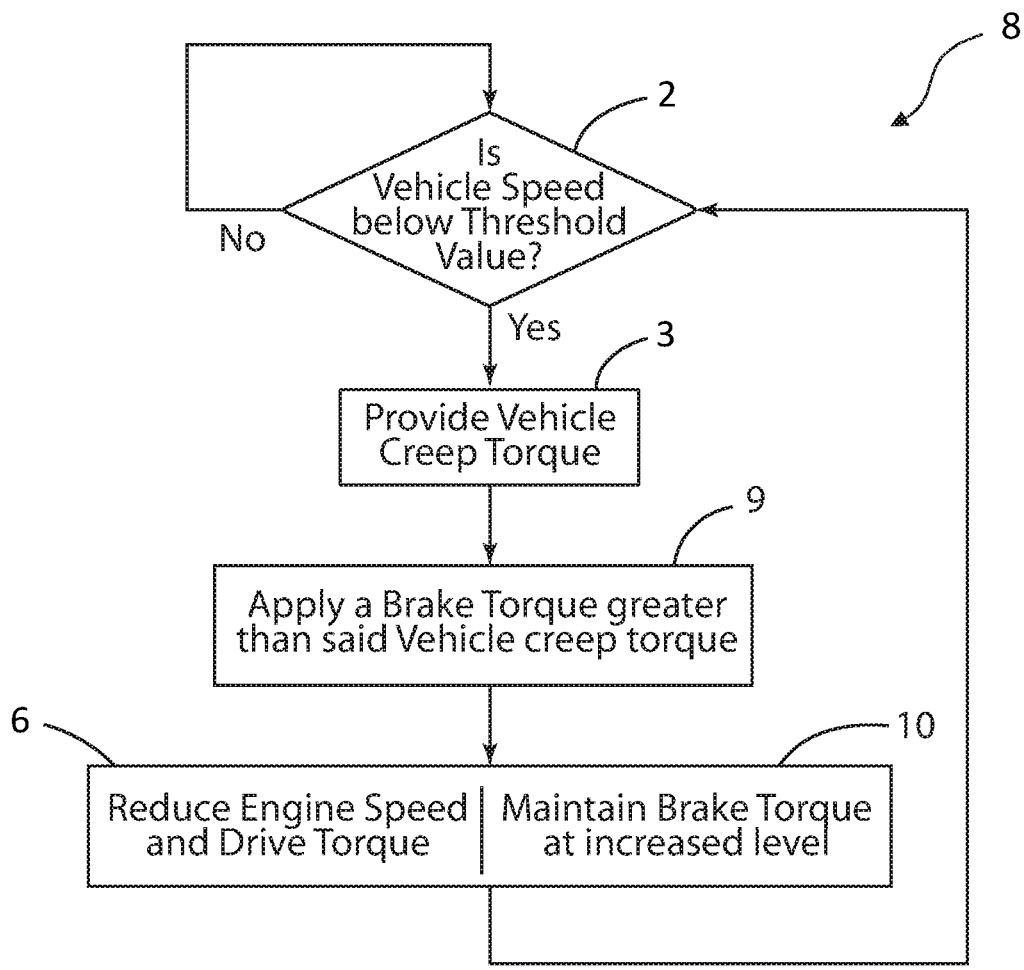
FIG. 2 is a second exemplary embodiment illustrating a flowchart of a method for controlling longitudinal movement of a motor vehicle.

FIG. 2 is a flow chart of an additional method 8 of the invention for smoothly stopping a motor vehicle according to a second exemplary embodiment.

The method 8 illustrated in FIG. 2 differs from the method 1 illustrated in FIG. 1 essentially in that, after the step 3, in a step 9, a braking torque is applied, independently of the driver, by a brake system of the motor vehicle, wherein the applied braking torque is at least as great as the creep torque present when the motor vehicle is at a standstill. Preferably, the braking torque is applied, which is slightly greater than the creep torque present when the motor vehicle is at a standstill, for example, being approximately 150 Nm greater than the creep torque at a standstill, in order to safely bring the motor vehicle to a standstill.

In the subsequent steps 6 and 10, which again take place simultaneously, the applied braking torque is maintained, and the creep or drive torque of the drive train is reduced until the motor vehicle comes to a standstill. Whereby, the difference between the creep torque applied by the drive train and the applied braking torque becomes negative, therefore the motor vehicle decelerates and ultimately comes to a standstill. Because the drive train should be considered to be a sluggishly acting actuator, this procedure takes place slowly such that any jolt occurring upon stopping of the motor vehicle is no longer perceptible by the vehicle occupants.

As set forth above, the exemplary embodiment discloses a method for the smooth stopping of a motor vehicle including the steps of providing a creep torque via a drive train of the motor vehicle. In one embodiment, the method then increases independently of the driver, an engine speed of a drive engine of the drive train to increase a drive torque of the drive engine, while simultaneously increasing, independently of the driver, a braking torque by means of a brake system of the motor vehicle to create or achieve a torque balance between the drive torque and the braking torque of the motor vehicle wherein the maximum braking torque achieved is at least as great as the creep torque during a standstill of the motor vehicle. After which the method maintains the maximum braking torque and simultaneously reduces the engine speed of the drive engine to a point at which the motor vehicle comes to a standstill.

In an alternative embodiment, the method applies, independently of the driver, a braking torque using a brake system of the motor vehicle, wherein the applied braking torque is at least as great as the creep torque present when the motor vehicle is at a standstill. The method then maintains the braking torque and simultaneously reduces the creep torque of the drive train to a point at which the motor vehicle comes to a standstill.

The exemplary embodiment smoothly stops, that is without a perceptible jolt, without independent driver intervention in the brake system, e.g., driver application of a service brake or a parking brake, instead a driver-independent intervention in the drive train of the motor vehicle is simultaneously carried out in order to generate a variable drive torque during the stopping operation. The drive train of the motor vehicle includes, in a conventional manner, all components that generate the power in the vehicle for driving the vehicle; i.e., for example, at least one drive engine. The driver-independent intervention in the drive train according to the invention offers the particular advantage of an extremely soft, i.e., smooth, and comfortable stopping of the motor vehicle, since the drive train is an actuator that acts relatively slowly as compared to the brake system. The motor vehicle decelerates while the drive torque of the drive train is reduced via the drive engine or the creep torque and finally comes to a standstill when the braking torque is greater than the drive torque or the creep torque of the motor vehicle. Since, according to an embodiment of the invention, the braking torque is at least as great as the creep torque of the motor vehicle at a standstill, and is preferably slightly greater, the method provides smooth and defined stopping of the motor vehicle.

The creep torque can be generated, for example, by a converter of an automatic transmission, which is driven by the drive engine of the motor vehicle, or by a double-clutch transmission of the motor vehicle.

In a case where in the creep torque is reduced, the creep torque is preferably reduced by reducing the engine speed in case of a torque converter or by clutch control of the double-clutch transmission by way of the clutch being at least partially disengaged. In this way, the vehicle, for example, having an automatic transmission that includes a converter, can be provided with an idle load reduction during idling. The function of the load reduction during idling is also referred to as ILR ("idle load reduction") or TILR ("transmission idle load reduction"). If the vehicle is equipped with an ILR or TILR function, after the driver-independent application and holding of the braking torque, the ILR or TILR function is activated relatively slowly, and therefore the clutch assigned to the automatic transmission or the double-clutch transmission is at least partially disengaged, whereby the drive torque or creep torque is reduced. If disengagement of the clutch is carried out sufficiently slowly, wherein a slip of the clutch for a certain period of time is also accepted, the motor vehicle comes to a standstill in such a way that any jolt occurring upon stopping is essentially no longer perceptible by the occupants. Since the braking torque is always selected to be at least as great as the creep torque present when the vehicle is at a standstill, and is preferably slightly greater, a smooth and defined stopping of the vehicle is obtainable.

The previously described reduction of the creep torque as compared to the temporary increase and subsequent decrease of the speed of the drive engine is not perceived by the occupants of the motor vehicle, for example, the operation cannot be heard. In addition, fuel consumption can also be slightly reduced as a result, since the driver-independent intervention does not take place by way of a change, that is an increase in the speed of the drive engine.

The driver-independent braking torque can also be applied by a service brake and/or a parking brake of the motor vehicle.

Figure 3A:
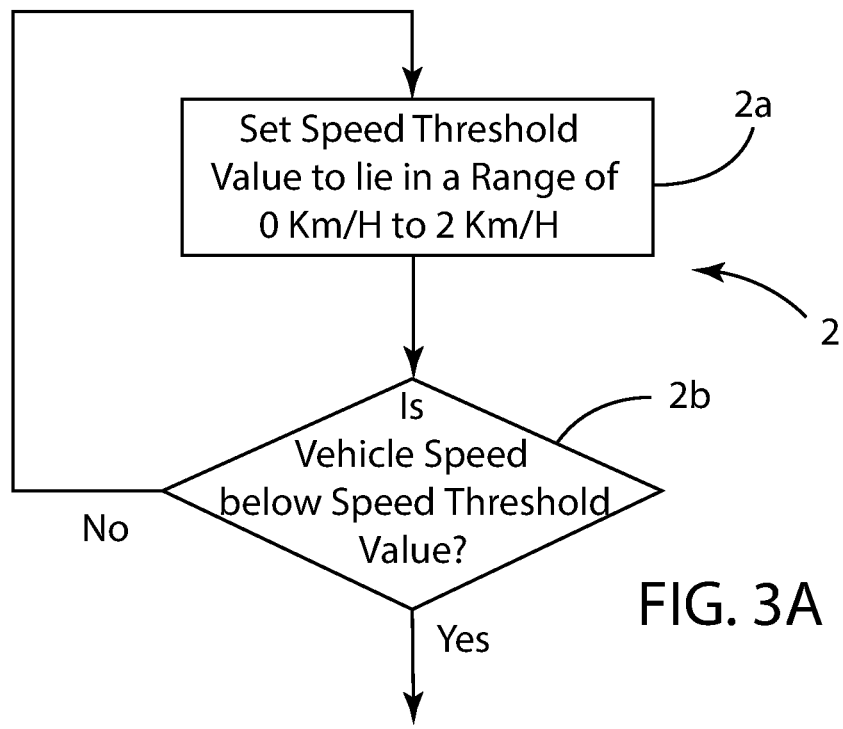
FIG. 3a is a third exemplary embodiment illustrating a flowchart of a method for controlling longitudinal movement of a motor vehicle.
Figure 3B:
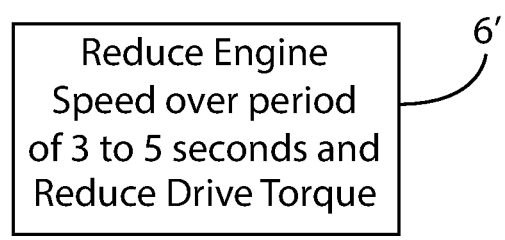
FIG. 3b is a fourth exemplary embodiment illustrating a flowchart of a method for controlling longitudinal movement of a motor vehicle.

According to fourth embodiment of the invention, as shown in FIG. 3b when the speed of the drive engine is reduced, the speed of the drive engine during the stopping operation is preferably reduced over a time period of approximately 3 seconds to approximately 5 seconds, step 6', for example, 4 seconds. This provides a sufficiently slow and soft deceleration of the motor vehicle, and therefore any jolt occurring upon stopping during the transition from a longitudinal movement of the motor vehicle to the standstill therefore is no longer perceived by occupants of the motor vehicle. It has been shown that an acceleration just below that which is perceptible by an average person can be considered to be approximately $0.05$ $m/s^2$. The method according to the invention is capable of achieving an ultimate acceleration of the motor vehicle during the transition from the longitudinal movement to the standstill which is below this threshold value.

According to yet another embodiment of the invention, in which the speed of the drive engine is reduced, the speed of the drive engine is reduced more rapidly in a range in which the drive torque of the drive engine essentially reaches the braking torque applied by the brake system. As a result, creep or groan noises, also referred to as "creep groan," that otherwise occur at the wheel brakes of the brake system are avoided and the comfort of the smooth stopping operation is further improved.

In addition, according to another embodiment of the invention, in which the speed of the drive motor is reduced, the speed of the drive motor is reduced only in a speed range that does not include the resonant frequency or the frequency of natural oscillations of a vehicle body of the motor vehicle and its harmonic components. Preferably, the speed of the drive engine is reduced, for example, in a range of approximately 1000 rpm to the idle speed of the drive engine, as a minimum, of approximately 700 to 750 rpm, and therefore the vehicle body is not excited by the drive engine to oscillate, which further improves the comfort of the smooth stopping operation.

According to yet another embodiment of the invention, the creep torque is reduced after the motor vehicle has come to a standstill or is essentially completely eliminated, for example, by shifting an automatic transmission or a double-clutch transmission, which provides the creep torque, into neutral. As a result, vehicle body oscillations during the stopping operation are essentially completely avoided, which even further improves the comfort of the smooth stopping operation. In addition, the reduction or elimination of the creep torque when the vehicle is at a standstill additionally reduces the energy consumption of the vehicle.

According to a third embodiment of the invention, the stopping operation is determined only when the absolute value of a longitudinal speed of the motor vehicle lies below a speed threshold value. As shown in FIG. 3a, preferably, this threshold value lies in a range of approximately 0 km/h to approximately 2 km/h, for example, 1 km/h. This increases the operational reliability of the motor vehicle because an intervention by the method according to the invention in the brake system or the drive engine does not take place when the absolute value of the longitudinal speed is above the threshold value.

The above-described method according to the invention and the device according to the invention are not limited to the embodiment disclosed herein, but rather also include further, identically acting embodiments.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for stopping a motor vehicle including:
   determining if the motor vehicle speed is below a speed threshold value;
   using a drive train to provide a creep torque;
   increasing, independently of a driver, engine speed of the drive train to increase a drive torque to an amount above the creep torque and simultaneously increasing, independently of the driver, a braking torque of a brake system of the motor vehicle to achieve a balance between the drive torque and the braking torque of the motor vehicle wherein a maximum braking torque is as great as the creep torque during a standstill of the motor vehicle; and
   maintaining the maximum braking torque and simultaneously reducing the engine speed of the drive engine to point at which the motor vehicle comes to the standstill.

2. The method of claim 1 wherein the creep torque is generated by a converter of an automatic transmission driven by the drive engine of the motor vehicle.

3. The method of claim 1 wherein the creep torque is generated by a double-clutch transmission of the motor vehicle; and
   the creep torque is reduced with a clutch of the double-clutch transmission by partially disengaging said clutch of said double-clutch transmission.

4. The method of claim 1 wherein the driver-independent braking torque is braking torque applied by a service brake or a parking brake of the motor vehicle.

5. The method of claim 1 wherein the step of reducing the engine speed occurs over a time period of 3 seconds to 5 seconds.

6. The method of claim 1 wherein the speed of the drive engine is reduced more rapidly in a range in which the drive torque of the drive engine essentially reaches the braking torque applied by the brake system than in a range in which the drive torque is greater than the braking torque.

7. The method of claim 1 wherein the step of reducing the engine speed occurs only in a speed range that does not include a resonant frequency of a vehicle body.

8. The method of claim 1 wherein the creep torque is reduced or completely eliminated after the vehicle has come to the standstill.

9. The method of claim 1 wherein a stopping operation occurs when a longitudinal speed of the motor vehicle is below the speed threshold value.

10. The method of claim 9 wherein the speed threshold value lies in a range of 0 km/h to 2 km/h.

11. A method for stopping a motor vehicle including:
- determining if the motor vehicle speed is below a speed threshold value;
- using a drive train to provide a creep torque;
- increasing independently of a driver, engine speed of the drive train to increase a drive torque to an amount above the creep torque and;
- applying, independently of the driver, a braking torque by a brake system of the motor vehicle, wherein the applied braking torque is as great as the creep torque present when the motor vehicle is at a standstill; and
- maintaining the braking torque and simultaneously reducing the creep torque of the drive train up to point at which the motor vehicle comes to the standstill.

12. The method of claim 11 wherein the creep torque is reduced or completely eliminated after the vehicle has come to the standstill.

13. The method of claim 11 wherein a stopping operation occurs when a longitudinal speed of the motor vehicle is below the speed threshold value.

14. The method of claim 11 wherein the speed threshold value lies in a range of 0 km/h to 2 km/h.

* * * * *